United States Defensive Publication [19] (H) [11] T986,007

Papia [43] Sep. 4, 1979

[54] STRESS DIFFUSER

[75] Inventor: Joseph D. Papia, Torrance, Calif.

[73] Assignee: Mobil Oil Corporation

[21] Appl. No.: 879,656

[22] Filed: Feb. 21, 1978

[51] Int. Cl.[2] ..... F22B 37/22

[52] U.S. Cl. ..... 122/360

[57] ABSTRACT

Means are provided for diffusing stresses, particularly in couplings between vertical heater tubes 2 and the connection to a tube (pigtail) 3 leading to a manifold, arising from temperature changes during start-up or shut-down, bending moments and vibration during operation. The stress diffuser may be installed at the connection of the manifold connection such as a "pigtail", to a heater tube and is constituted by a short tube 1 machined to varying inside diameter (preferably constant OD) by tapered wall thickness from a mid-section of maximum wall thickness to lesser wall thickness toward the ends of the stress diffuser. For ease of repair and replacement, the stress diffuser is fitted in a collar 4 on the heater tube.

1 Claim, 1 Sheet Drawing,

6 Pages Specification

The file of this unexamined application may be inspected and copies thereof may be purchased (849 O.G. 1221, Apr. 9, 1968).

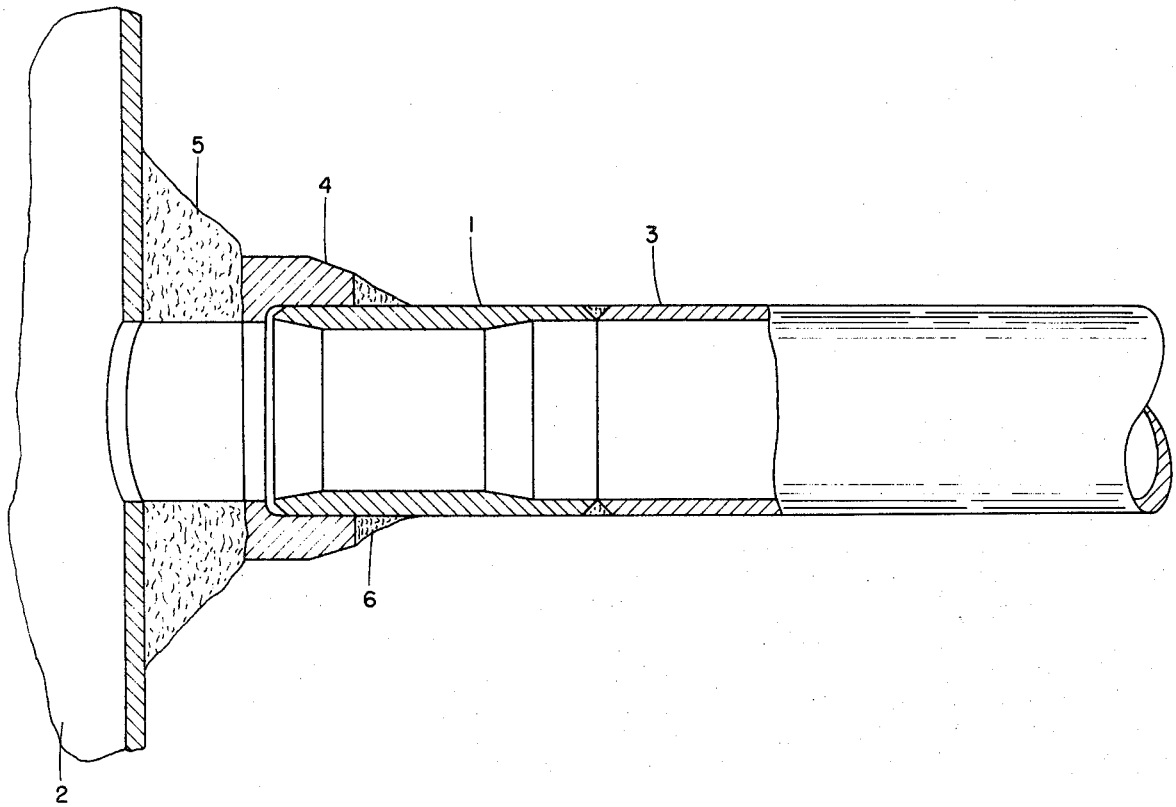

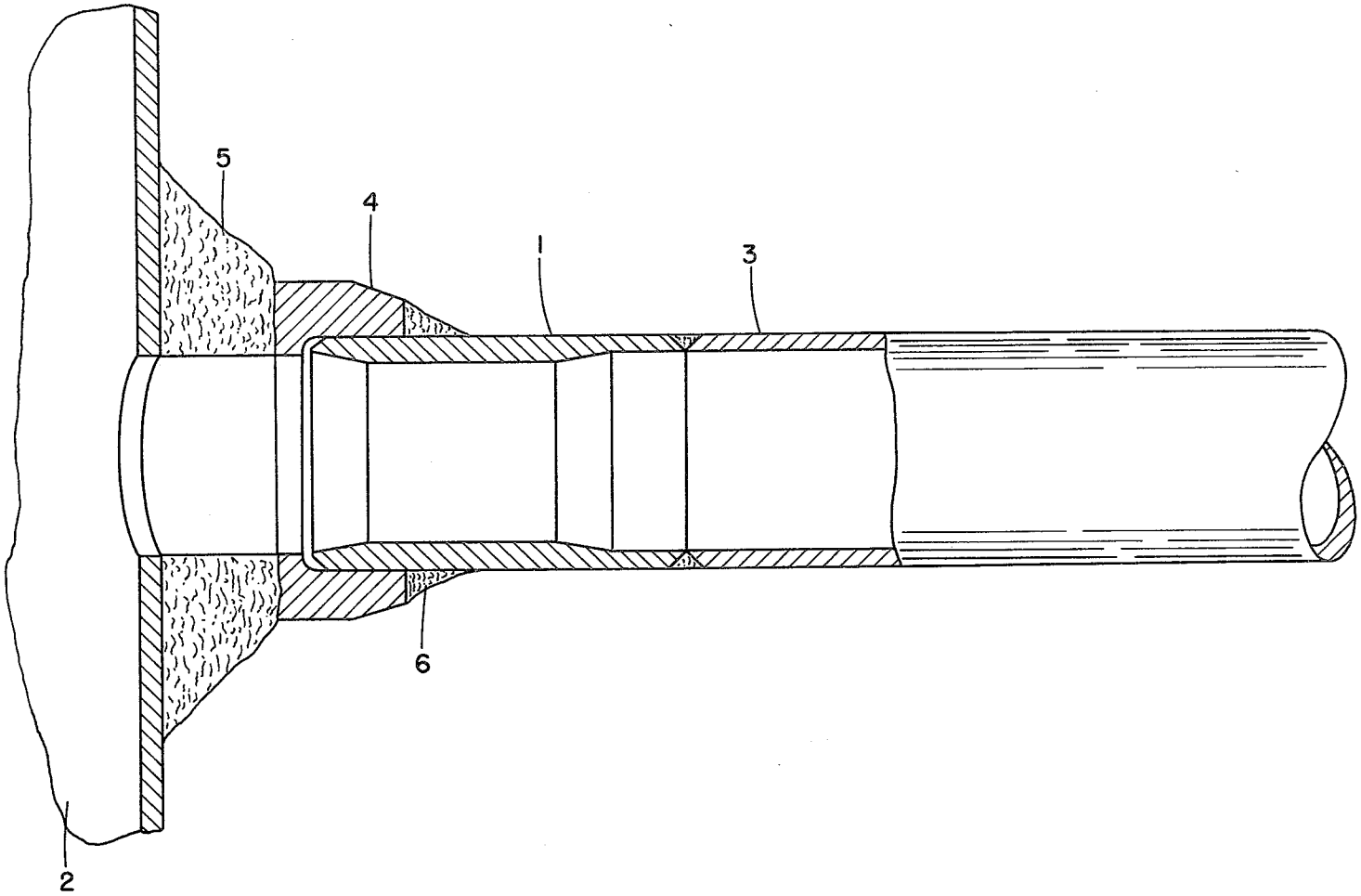
3
1
4
5
6
2